United States Patent
Nagai et al.

(10) Patent No.: US 9,701,878 B2
(45) Date of Patent: Jul. 11, 2017

(54) ABRASIVE REGENERATION METHOD

(71) Applicant: KONICA MINOLTA, INC., Chiyoda-ku (JP)

(72) Inventors: Yuuki Nagai, Tachikawa (JP); Akihiro Maezawa, Hino (JP); Atsushi Takahashi, Musashino (JP)

(73) Assignee: KONICA MINOLTA, INC., Tokyo (JP)

( * ) Notice: Subject to any disclaimer, the term of this patent is extended or adjusted under 35 U.S.C. 154(b) by 244 days.

(21) Appl. No.: 14/379,046

(22) PCT Filed: Feb. 14, 2013

(86) PCT No.: PCT/JP2013/053490
§ 371 (c)(1),
(2) Date: Aug. 15, 2014

(87) PCT Pub. No.: WO2013/122128
PCT Pub. Date: Aug. 22, 2013

(65) Prior Publication Data
US 2015/0121769 A1 May 7, 2015

(30) Foreign Application Priority Data
Feb. 16, 2012 (JP) .................................. 2012-031603

(51) Int. Cl.
*C09K 3/14* (2006.01)
*B24B 57/02* (2006.01)
(Continued)

(52) U.S. Cl.
CPC ............ *C09K 3/1463* (2013.01); *B24B 57/02* (2013.01); *C02F 11/14* (2013.01); *C02F 2103/12* (2013.01)

(58) Field of Classification Search
None
See application file for complete search history.

(56) References Cited

U.S. PATENT DOCUMENTS 5,755,614 A 5/1998 Adams et al.
6,258,137 B1 * 7/2001 Garg ..................... B82Y 30/00
106/3

FOREIGN PATENT DOCUMENTS

CN 101280175 10/2008
EP 2 796 243 10/2014
(Continued)

OTHER PUBLICATIONS

Kinzoku-Shigen Report (Report regarding metal resources) p. 45, Nov. 2010 (w/English translation).
(Continued)

*Primary Examiner* — Chester Barry
(74) *Attorney, Agent, or Firm* — Cozen O'Connor (57) ABSTRACT

Technique to provide an abrasive regeneration method which, from a used abrasive slurry, can recover an abrasive by an efficient method and can thereafter obtain a high-purity regenerated abrasive by a simple method. This abrasive regeneration method uses an abrasive comprising at least one type of abrasive selected from diamond, boron nitride, silicon carbide, alumina, alumina zirconia and zirconium oxide. The abrasive regeneration involves a slurry recovery step (A) for recovering an abrasive slurry discharged from a polishing machine, a separation and concentration step (B) for adding an alkaline earth metal salt as an inorganic salt to the recovered abrasive slurry to aggregate the abrasive, and separating and concentrating the abrasive from a mother liquor, and an abrasive recovery step (C) for recovering the separated and concentrated abrasive.

8 Claims, 3 Drawing Sheets

(51) Int. Cl.
*C02F 11/14* (2006.01)
*C02F 103/12* (2006.01)

(56) References Cited

FOREIGN PATENT DOCUMENTS

| | | |
|---|---|---|
| EP | 2 799 185 | 11/2014 |
| JP | 62-279838 | 12/1987 |
| JP | 06-254764 | 9/1994 |
| JP | 11-050168 | 2/1999 |
| JP | 11-090825 | 4/1999 |
| JP | 2000-254659 | 9/2000 |
| JP | 2000-254659 A1 * | 9/2000 |
| JP | 2001-308041 | 11/2001 |
| JP | 2001-308043 | 11/2001 |
| JP | 2001308041 A * | 11/2001 |
| JP | 2008-188723 | 8/2003 |
| JP | 2004-306210 | 11/2004 |
| JP | 2008-188723 | 8/2008 |
| JP | 2009-172712 | 8/2009 |
| JP | 2009256131 A * | 11/2009 |
| JP | 2010-214515 | 9/2010 |
| JP | 2011-041876 | 3/2011 |
| KR | 10-1055454 | 8/2011 |
| SG | 11 2014 03175 P | 8/2014 |
| SG | 11 2014 03191 P | 8/2014 |
| WO | WO 2007/105714 | 9/2007 |

OTHER PUBLICATIONS

Office Action (dated Sep. 27, 2016) issued by the Japanese Patent Office in corresponding Application No. 2013-558718.

* cited by examiner

ABRASIVE REGENERATION METHOD

RELATED APPLICATIONS

This is a U.S. National stage of International application No. PCT/JP2013/053490 filed on Feb. 14, 2013.

This patent application claims the priority of Japanese application no. 2012-031603 filed Feb. 16, 2012 the disclosure content of which is hereby incorporated by reference.

FIELD OF THE INVENTION

The present invention relates to a method for collecting a used abrasive from a used abrasive-containing slurry and reusing the collected abrasive as a regenerated abrasive.

BACKGROUND ART

As an abrasive for finely polishing an optical glass, a glass substrate or the like in a finishing process, fine particles with high degree of hardness have been used. Such fine particles can be typified by fine particles of diamond, boron nitride, silicon carbide, alumina, alumina-zirconia, zirconium oxide and cerium oxide.

Some of the main components of the abrasives are obtained from minerals that are not produced in Japan, and thus partially relies on imported materials. In addition, many of the main components of the abrasives are expensive.

The abrasive used for the above purposes is composed of fine particles with high degree of hardness and thus important for uses as an optical abrasive for electronic components such as optical lens, semiconductor silicone substrates and glass plates of liquid crystal displays in large quantity. An abrasive for optical abrasion contains the above-mentioned compound as its main component, and may further contain a transition metal element(s) such as sodium salts and chromium salts and/or a rare-earth element(s) such as yttrium and dysprosium. Thus, an abrasive for optical abrasion is strictly inhibited from being simply disposed considering environmental pollution. A waste liquid of an abrasive used in polishing is therefore strongly desired to be made non-polluting. Hence, techniques to reuse a resource(s) in an optical abrasive waste liquid containing a used abrasive and to make such a waste liquid non-polluting are important.

In various fields of industry, a conventional method for disposing a waste liquid that contains suspended particles normally includes aggregating and separating the suspended particles using a neutralizer, inorganic coagulant or polymeric coagulant, discharging a treated solution and disposing the aggregated and separated sludge by incineration or the like.

The abrasive for the above purposes is used in large quantity in a polishing process, and its waste liquid contains a component(s) derived from the polished object, e.g., debris of a polished optical glass. In addition, it is difficult to efficiently separate the abrasive from the component(s) derived from the polished object. Because a waste liquid is disposed after use at present as described above, there are problems concerning environmental burdens and disposal cost.

Thus, it has become important to establish a method for efficiently collecting a main component of an abrasive for recycling the element which is a scarce material.

As a method for collecting an abrasive component, Patent Document 1 discloses a solid-liquid separation method including adding an electrolyte to a used abrasive liquid to aggregate and let settle out the abrasive and to dissolve a component(s) derived from a polished substrate. In a method described in Patent Document 1, an alkali metal hydroxide, alkali metal carbonate, alkali metal salt and ammonium salt are used as the electrolyte.

Patent Document 2 discloses a solid-liquid separation method including adding a sodium hydroxide solution and potassium hydroxide solution to a used abrasive and separating a solid component. Patent Document 3 discloses a method including adding sulfuric acid to a used abrasive, applying heat thereto, dissolving a rare-earth element and rare metal, and separating and removing an aggregate of silica etc. in the slurry.

Patent Document 4 discloses a method for collecting a colloidal silica-based abrasive, the method including adding an alkali to a chemical mechanical polishing (CMP) waste liquid in the presence of a magnesium ion to adjust pH to 10 or higher and cause aggregation. Non-Patent Document 1 is a review article regarding the above-described metal-collecting methods.

However, the above methods disclosed by Patent Documents 1 to 4 provide a collected abrasive of insufficient purity. Such a collected abrasive is not suitable for fine polishing.

In the method of Patent Document 4, if an abrasive mainly composed of cerium oxide is used in polishing an object mainly composed of silicon such as a glass, addition of an additive such as magnesium chloride to an abrasive-containing slurry that contains a used abrasive at a pH of 10 or higher causes co-aggregation of an abrasive component and a glass component, which lowers the purity of an obtained regenerated abrasive. This would be because when the pH is 10 or higher, a component(s) derived from a polished object mainly composed of silicon (e.g., glass) become easier to aggregate than the abrasive component does upon addition of the additive.

Patent Document 5 discloses a method for producing a regenerated cerium oxide-containing abrasive by freezing a collected used liquid to regenerate secondary particles of cerium oxide and removing water. However, this method of Patent Document 5 requires huge facilities for conducting the freezing and thus requires enormous initial investment.

PRIOR ART DOCUMENT

Patent Document

Patent Document 1: Japanese Patent Application Laid-Open Publication No. Hei06-254764
Patent Document 2: Japanese Patent Application Laid-Open
Patent Document 3: Japanese Patent Application Laid-Open Publication No. Hei11-50168
Patent Document 4: Japanese Patent Application Laid-Open Publication No. 2000-254659
Patent Document 5: Japanese Patent Application Laid-Open Publication No. 2010-214515

Non-Patent Document

Non-Patent Document 1: Kinzoku-Shigen Report (Report regarding metal resources) p. 45, November 2010

SUMMARY OF THE INVENTION

Problems to be Solved by the Invention

The present invention is made in view of the above-described problems, and an object of the present invention is to provide a method for regenerating an abrasive that enables efficient collection of an abrasive from a used abrasive-containing slurry and obtainment of a high-purity regenerated abrasive in a simple manner.

Means for Solving Problems

The present inventors have earnestly studied given the above problems, and provide a method for regenerating an abrasive from a used abrasive-containing slurry, the method including (A) collecting an abrasive-containing slurry that contains a used abrasive, (B) separating the abrasive from a mother liquid and concentrating the abrasive by adding an alkaline earth metal salt as an inorganic salt to the collected abrasive-containing slurry and aggregating the abrasive, and (C) collecting the separated and concentrated abrasive, wherein the abrasive is selected from specific abrasives. The present inventors found that this method enables efficient collection of an abrasive from a used abrasive and obtainment of a high-purity regenerated abrasive in a simple manner. The present invention has been thus made.

That is, the above object of the present invention is accomplished by the following ways.

1. A method for regenerating an abrasive from a used abrasive-containing slurry, the method including:
   (A) collecting an abrasive-containing slurry discharged from an abrasive device;
   (B) separating the abrasive from a mother liquid and concentrating the abrasive by adding an alkaline earth metal salt as an inorganic salt to the collected abrasive-containing slurry and aggregating the abrasive; and
   (C) collecting the separated and concentrated abrasive.
   The abrasive is at least one selected from a group consisting of diamond, boron nitride, silicon carbide, alumina, alumina-zirconia and zirconium oxide.

2. The method of the above item 1, further including (D) adjusting sizes of particles of the collected abrasive, after the step (C).

3. The method of the above item 1 or 2, wherein the separating and concentrating are conducted at a converted pH of less than 10.0 of the mother liquid at 25° C. in the step (B).

4. The method of any one of the above items 1 to 3, wherein
   a first abrasive-containing slurry that contains washing water and a second abrasive-containing slurry that was used are collected in the step (A).

5. The method of the above item 4, wherein
   the first abrasive-containing slurry and the second abrasive-containing slurry collected in the step (A) are mixed and thereafter subjected to the step (B) and the step (C).

6. The method of the above item 4, wherein
   the first abrasive-containing slurry and the second abrasive-containing slurry collected in the step (A) are separately subjected to the step (B) and the step (C).

7. The method of any one of the above items 1 to 6, wherein
   the alkaline earth metal salt used in the step (B) is a magnesium salt.

8. The method of any one of the above items 1 to 7, wherein
   in the step (C), the abrasive is collected through separation by decantation utilizing spontaneous sedimentation.

9. The method of the above item 2, wherein
   in the step (D), a dispersing agent is added to a solution of the collected abrasive, and thereafter dispersion of the abrasive is conducted using an ultrasonic disperser or a bead mill disperser to control the sizes of the particles of the regenerated abrasive.

10. The method of the above item 9, wherein
    the ultrasonic disperser is used in the step (D).

11. The method of the above items 9 or 10, wherein the dispersing agent is composed of a poly-carboxylic acid-based polymer.

Effects of the Invention

By virtue of the above ways of the present invention, there is provided a method for regenerating an abrasive that enables efficient collection of an abrasive from a used abrasive-containing slurry and obtainment of a high-purity regenerated abrasive in a simple manner.

The mechanisms of the above effect of the present invention are not fully and definitively revealed, but the following reasoning can be made.

The effect of the present invention is characterized in that the method for selectively collecting an abrasive from the used abrasive-containing slurry in high concentration enables not only collection of an abrasive but also increases degree of purity of the collected abrasive and facilitates regeneration of the collected abrasive.

The technical idea of the present invention is utilization of a presumable specific interaction between an abrasive and an inorganic salt.

It has been a common technique to add a coagulant having high specific weight to a used abrasive to separate the used abrasive as a solid component, followed by purification of the separated abrasive for regenerating the abrasive. In the collected abrasive, a glass component derived from a polished object and generated in glass polishing such as silicon dioxide particles are also included. To separate this glass component, various further processes are required.

On the other hand, in the method of the present invention for regenerating an abrasive, an inorganic salt (alkaline earth metal salt) aggregates together only with an abrasive, and a non-abrasive glass component hardly aggregates and remains in a mother liquid. Thus, only a high-purity abrasive can be separated. Hence, the method of the present invention does not require a subsequent purification and can simplify a step(s) after the separation.

In the present invention, it is needed that the pH of the mother liquid which contains a used abrasive-containing slurry is maintained to be a certain value, i.e., less than the pH after the addition of the inorganic salt, after the addition of the inorganic salt to the separation of the concentrate of the abrasive aggregate. In the present invention, the pH after the addition of an inorganic salt means the pH right after (upon) the end of adding an inorganic salt in the step (B).

It has been commonly conducted that pH of a waste liquid is raised in order to dissolve a glass component in the waste liquid. On the other hand, the present invention does not require any adjustment of pH because a glass component does not aggregate by virtue of addition of a magnesium salt.

It is also found that the inorganic salt used in collecting an abrasive is partially absorbed in abrasive particles and thus remains in the regenerated abrasive, and found that this inorganic salt is bonded to the abrasive via a peculiar bond and prevents the abrasive from becoming too fine particles in a future use as an abrasive.

EMBODIMENTS FOR CARRYING OUT THE INVENTION

The method of the present invention is a method for regenerating an abrasive from a used abrasive-containing slurry, wherein the abrasive is at least one selected from the abrasives described below, and the method for regenerating the abrasive includes the steps below.

(A) collecting an abrasive-containing slurry discharged from an abrasive device (B) separating the abrasive from a mother liquid and concentrating the abrasive by adding an alkaline earth metal salt as an inorganic salt to the collected abrasive-containing slurry and aggregating the abrasive (C) collecting the separated and concentrated abrasive Group of abrasives: diamond, boron nitride, silicon carbide, alumina, alumina-zirconia and zirconium oxide The features are common in the inventions of claims 1 to 11.

As embodiments of the present invention, the method of the present invention further includes the particle size adjusting step (D) to adjust particle sizes of the collected abrasive after the abrasive collecting step (C). Preferably, the separating and concentrating are conducted at a converted pH of less than 10.0 of the mother liquid at 25° C. in the step (B), to separate the abrasive from the mother liquid and concentrate the abrasive more efficiently. Preferably, a first abrasive-containing slurry that contains washing water and a second abrasive-containing slurry that was used are collected in the step (A). Preferably, the first abrasive-containing slurry and the second abrasive-containing slurry collected in the step (A) are mixed and prepared as a mother liquid and thereafter subjected to the step (B) and the step (C), or the first abrasive-containing slurry and the second abrasive-containing slurry collected in the step (A) are separately subjected to the step (B) and the step (C). Preferably, the alkaline earth metal salt used in the step (B) is a magnesium salt. Preferably, in the step (C), the abrasive is collected through separation by decantation utilizing spontaneous sedimentation.

Preferably, in the step (D), a dispersing agent is added to a solution of the collected abrasive, and thereafter dispersion of the abrasive is conducted using an ultrasonic disperser or a bead mill disperser to control the sizes of the particles of the regenerated abrasive. Preferably, the ultrasonic disperser is used in the step (D) and the dispersing agent is composed of a poly-carboxylic acid-based polymer, to achieve effects of the present invention more sufficiently.

The present invention, and elements and embodiments thereof will now be described in detail. Ranges of values expressed with "(from) A to B" in the following description include the values A and B as the minimum and maximum values of the ranges.

<<Method for Regenerating Abrasive>>

Figure 1:
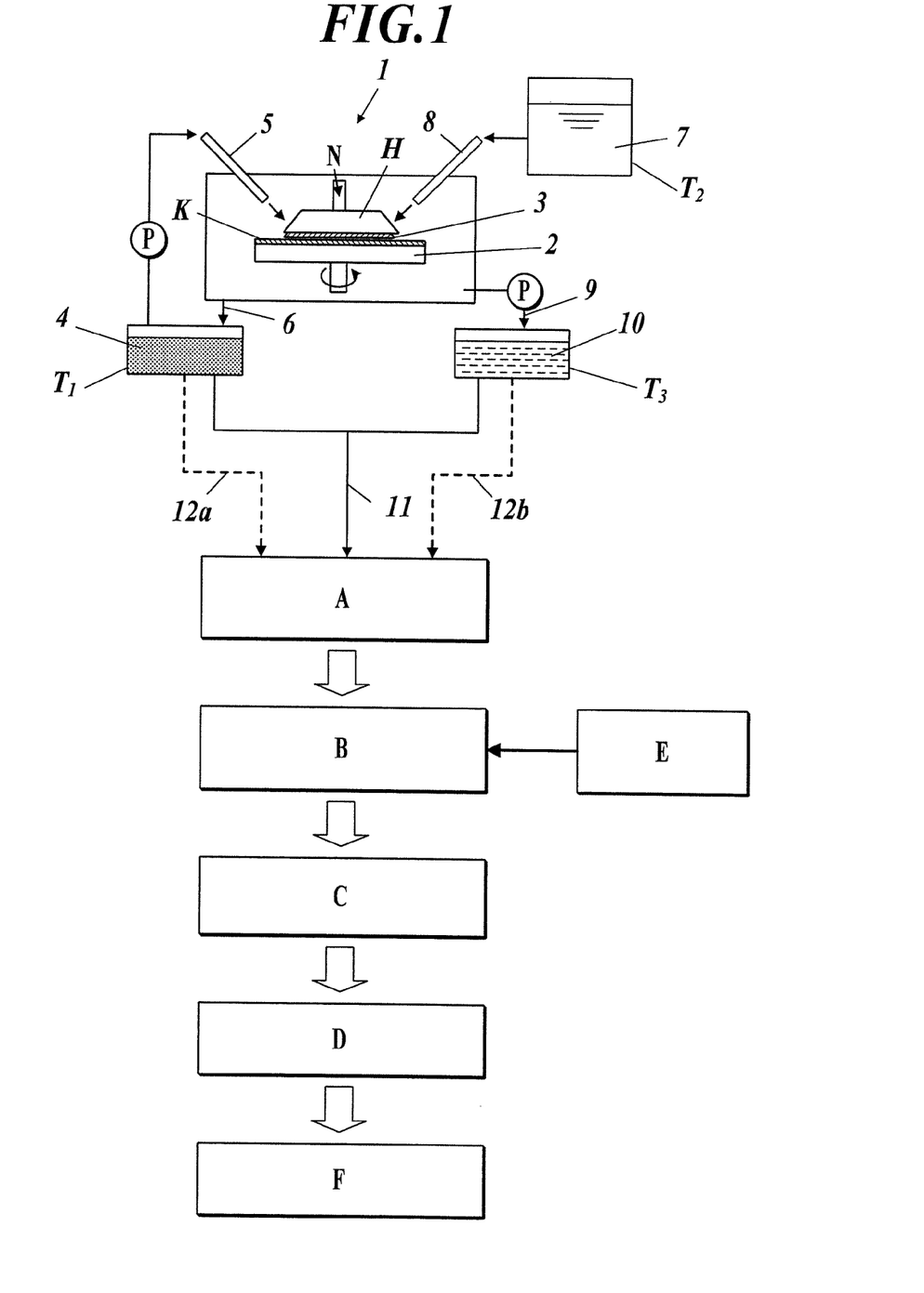
FIG. 1 This is a schematic diagram illustrating a flow chart of elemental steps of the method of the present invention for regenerating an abrasive.

A flow chart of the steps of the whole method of an embodiment of the present invention for regenerating an abrasive will now be described with reference to the drawing.

FIG. 1 is a schematic diagram illustrating a flow chart of elemental steps of the method of the present invention for regenerating an abrasive.

In a polishing process illustrated in FIG. 1, an abrasive device 1 includes an abrasive surface plate 2 on which an abrasive cloth K composed of a non-woven cloth, synthetic resin foam or synthetic leather is adhered. The abrasive surface plate 2 is rotatable. In polishing, the abrasive surface plate 2 is rotated while an object 3 to be polished (e.g., glass) is pushed against the abrasive surface plate 2 with a predetermined pressure force N using a holder H. Simultaneously, an abrasive-containing liquid 4 (i.e., the second abrasive-containing slurry) is supplied through a slurry nozzle 5 using a pump P. The abrasive-containing liquid 4 (second abrasive-containing slurry) used in the polishing passes through a flow path 6 and is then put and pooled in a slurry tank $T_1$. The abrasive-containing liquid 4 is repeatedly circulated through the abrasive device 1 and the slurry tank $T_1$.

Washing water 7 is pooled in a washing water tank $T_2$, and for washing the abrasive device 1, sprayed through a washing water-spraying nozzle 8 to a polishing portion. Then, an abrasive-containing wash liquid 10 (first abrasive-containing slurry) passes through a flow path 9 through a pump and is then put and pooled in a wash liquid tank $T_3$. The wash liquid tank $T_3$ is used for pooling the wash liquid that was used in the washing (rinsing). The pooled liquid is continuously stirred using a stirring blade to avoid sedimentation and aggregation.

The abrasive-containing liquid 4 (second abrasive-containing slurry) generated in the above polishing that is pooled in the slurry tank $T_1$ and was circulated and used, and the wash liquid 10 (first abrasive-containing slurry) that is pooled in the wash liquid tank $T_3$ both contain not only particles of the abrasive but also a non-abrasive component(s) removed from the polished object 3 (e.g., glass) which is polished in the polishing process.

Subsequently, the abrasive-containing liquid 4 (second abrasive-containing slurry) and the wash liquid 10 (first abrasive-containing slurry) are mixed and then collected, or are separately collected. This step is defined as a slurry collecting step A.

Thereafter, to a mixture of or each of the abrasive-containing liquid 4 (second abrasive-containing slurry) and the wash liquid 10 (first abrasive-containing slurry) which are collected in the slurry collecting step A (the mixture of these liquids is called a mother liquid, and each liquid is also called a mother liquid), an alkaline earth metal salt is added as an inorganic salt, to aggregate the abrasive selectively and not to aggregate a non-abrasive component(s) (e.g., glass powder), without using any pH adjusting agent. Then, the abrasive is separated from the mother liquid and the abrasive-containing slurry is concentrated (a separating and concentrating step B).

Then, solid-liquid separation is conducted utilizing spontaneous sedimentation to separate the concentrate which contains the abrasive from a supernatant which contains a non-abrasive component. No forcible way is employed in this separation. The mother liquid is thus separated into the supernatant containing the non-abrasive component(s) etc. and the concentrate containing the abrasive sediment. Thereafter, the supernatant is disposed by decantation, e.g., tilting of the container, or by putting a discharging pipe to reach near the interface between the supernatant and the concentrate in the container so as to discharge only the supernatant from the container and collect the abrasive (an abrasive collecting step C).

In the present invention, it is preferable to adjust sizes of the abrasive particles in the separated concentrated abrasive slurry as the step (D) after the abrasive collecting step (C). In the separated abrasive-containing slurry, particles of the abrasive form aggregates (i.e., secondary particles) together with the inorganic salt. In order to break the aggregates into almost pure primary particles, water and a dispersing agent are added, and a dispersing device is used to obtain particles with desired sizes (the particle size adjusting step D).

A high-quality and high-purity regenerated abrasive can be thus obtained in such a simple manner.

Next, details of the method of the embodiment of the present invention for regenerating an abrasive and techniques for the method will now be described.

[Abrasive]

Generally, fine particles of Bengala ($\alpha$ $Fe_2O_3$), cerium oxide, aluminum oxide, manganese oxide and/or zirconium oxide, or colloidal silica is dispersed as an abrasive in water or oil to form a slurry, and it is used for polishing optical glasses, semiconductor substrates and the like. The abrasive regeneration method of the present invention is applied to collecting an abrasive which is at least one selected from the group consisting of diamond, boron nitride, silicon carbide, alumina, alumina-zirconia and zirconium oxide. These abrasives are applicable to Chemical Mechanical Polishing (CMP). CMP utilizes mechanical and chemical actions and achieves sufficient speed and highly fine flatness in polishing the surface of a semiconductor substrate or a glass.

As the abrasives employable in the present invention, examples of diamond abrasives include synthetic diamond and mined diamond, and examples of boron nitride abrasives include cubic boron nitride BN (manufactured by SHOWA DENKO K.K.). Boron nitride abrasives are second to diamond abrasives in terms of degree of hardness.

Examples of silicon carbide abrasives include silicon carbide abrasives, green silicon carbide abrasives and black silicon carbide abrasives. Examples of alumina abrasives include alumina abrasives, brown fused alumina abrasives, white fused alumina abrasives, pink fused alumina abrasives, cracked alumina abrasives and alumina-zirconia abrasives. Examples of zirconium oxide abrasives include BR series zirconium oxide for polishing manufactured by DAI-ICHI KIGENSO KAGAKU KOGYO CO., LTD.

The composition and shape of the abrasive used in the present invention is not particularly limited, and a commercially available abrasive can be used. Preferably, the content of the abrasive component is 50% by mass or more to achieve the effects of the present invention more sufficiently.

[Polishing Process]

The abrasive is used in the polishing process as illustrated in FIG. 1. The present invention is a method for regenerating an abrasive from a used abrasive that is used as described below.

Taking polishing of a glass substrate as an example, a polishing process is normally composed of preparing an abrasive-containing slurry, polishing and washing of a polishing portion, as illustrated in FIG. 1.

(1) Preparation of Abrasive-Containing Slurry

Powder of an abrasive is added in an amount of 1 to 40% by mass to a solvent such as water and then dispersed in the solvent to obtain an abrasive-containing slurry. This abrasive-containing slurry is circulated through an abrasive device and used as illustrated in FIG. 1. The fine particles used as the abrasive have an average size ranging from several dozen nanometers to several micrometers.

It is preferable that aggregation of the abrasive particles is prevented by adding a dispersing agent and the like, and dispersing state is maintained by stirring using a stirrer or the like. In general, it is preferable that a tank used for pooling an abrasive-containing slurry is arranged next to an abrasive device, dispersing state is maintained using a stirrer or the like, and the abrasive-containing slurry is supplied to the abrasive device and circulated through the abrasive device using a supplying pump.

(2) Polishing

As illustrated in FIG. 1, a glass substrate is polished by bringing the object 3 to be polished (e.g., the glass substrate) into contact with the abrasive pad (abrasive cloth K) and moving the glass substrate 3 and the abrasive pad K relative to each other applying pressure force while supplying the abrasive-containing slurry to the contacting face.

(3) Washing

When the polishing is finished, a large quantity of the abrasive is present on the glass substrate 3 and the abrasive device. Thus, water or the like is supplied in place of the abrasive-containing slurry after the polishing to wash the abrasive to remove it from the glass substrate and the abrasive device, as explained above with reference to FIG. 1. Then, the washing water 10 which contains the abrasive is discharged to the outside 9 of the polishing system.

As a result of the washing, a certain amount of the abrasive is discharged to the outside of the polishing system, and thus the amount of the abrasive in the polishing system is reduced. To make up for this reduction, a fresh abrasive-containing slurry is newly supplied to the slurry tank $T_1$. The addition may be conducted once every polishing process or once every predetermined times of repeated polishing process. Preferably, the abrasive is in a well-dispersed state in the solvent when added.

[Used Abrasive-Containing Slurry]

In the present invention, the used abrasive-containing slurry is the abrasive-containing slurry discharged to the outside of the system including the abrasive device 1, the slurry tank $T_1$ and the wash liquid tank $T_3$, and is categorized mainly into the following two types.

One is a first abrasive-containing slurry which contains the washing water discharged in the washing process and is pooled in the wash liquid tank $T_3$ (a rinse slurry), and the other is a second abrasive-containing slurry that was used and is pooled in the slurry tank $T_1$, and that is disposed after use for a certain number of times of polishing (a life-ended slurry). In the present invention, they are called the first abrasive-containing slurry and the second abrasive-containing slurry, respectively. The present invention is preferably applied to both of the first abrasive-containing slurry and the second abrasive-containing slurry, but may be applied to either of them.

The first abrasive-containing slurry which contains the washing water is characterized by the following two features.

1) This slurry is discharged in the washing. Thus, this slurry contains a large amount of the washing water and the concentration of the abrasive in this slurry is drastically lower than that of the slurry in the tank.

2) The glass component which was present on the abrasive cloth or the like is included in this first abrasive-containing slurry as a result of the washing.

On the other hand, the second abrasive-containing slurry is characterized in that the concentration of the glass component is higher than that of a fresh abrasive-containing slurry.

[Regeneration of Abrasive]

In the present invention, the method for regenerating the abrasive from the abrasive-containing slurry and reusing the abrasive as the regenerated abrasive is mainly composed of the three steps, namely, the slurry collecting step A, the separating and concentrating step B and the abrasive collecting step C as briefly explained in FIG. 1 (manufacturing flow). Preferably, the present invention is composed of the four steps, namely, the above three steps and the particle size adjusting step D after the step C.

(1: Slurry Collecting Step A)

In this step, the abrasive-containing slurry discharged from the system composed of the abrasive device and the slurry tank is collected. The slurry to be collected in this step is categorized into the first abrasive-containing slurry which contains the washing water and the second abrasive-containing slurry which was used.

Generally, the concentration of the abrasive in the collected abrasive-containing slurry is 0.1 to 40% by mass.

The collected abrasive-containing slurry may be subjected to the separating step immediately after the collection or may be pooled to obtain a certain amount of the collected abrasive-containing slurry. In each case, it is preferable to continuously stir the collected abrasive-containing slurry to prevent aggregation of the particles and to maintain the stable dispersing state.

In the present invention, the first abrasive-containing slurry and the second abrasive-containing slurry collected in the slurry collecting step A may be mixed with each other to prepare the mother liquid and then subjected to the separating and concentrating step B and the abrasive collecting step C. Otherwise, the first abrasive-containing slurry and the second abrasive-containing slurry collected in the slurry collecting step A may be separately subjected to the separating and concentrating step B and the abrasive collecting step C as the mother liquids independent from each other.

(2: Separating and Concentrating Step B)

The collected abrasive-containing slurry which was used contains a glass component derived from the polished object. The concentration of the abrasive is decreased due to influx of the washing water. To reuse the collected abrasive for the polishing, the glass component and the like need to be separated, and the abrasive component needs to be concentrated.

In the separating and concentrating step B of the present embodiment, without using any pH adjusting agent, an inorganic salt, namely, an alkali earth metal salt is added to the collected abrasive-containing slurry (mother liquid) which was collected in the slurry collecting step A to aggregate the abrasive selectively and not to aggregate a non-abrasive component(s). The abrasive is separated from the mother liquid and concentrated. Hence, the abrasive component is aggregated selectively and then sedimentation occurs. Then, the aggregate is separated while most of the glass component remains in the supernatant. Thus, this step enables both of the separation of the abrasive component from the glass component and the concentration in the abrasive-containing slurry.

Specific operations will now be described with reference to FIG. 2.

Figure 2:
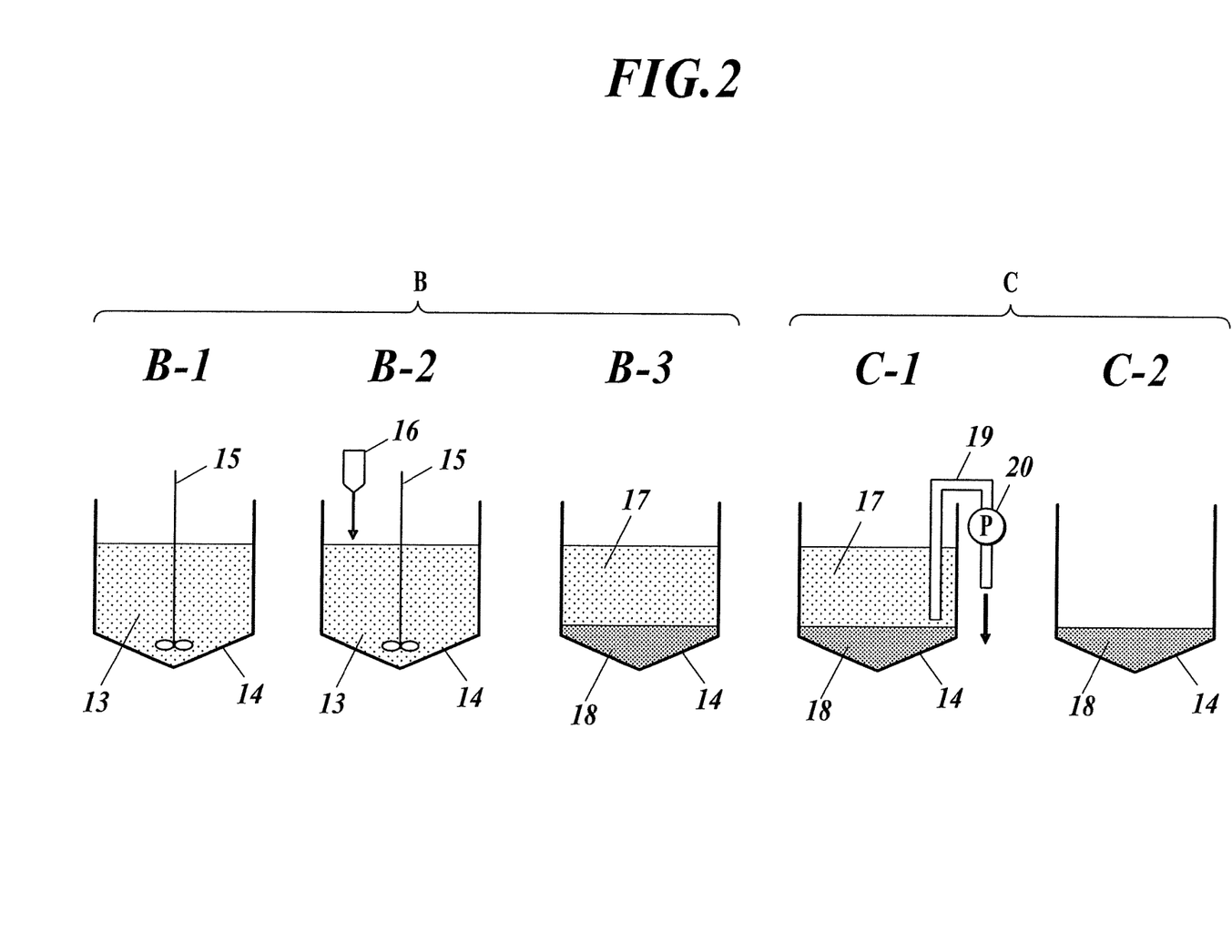
FIG. 2 This is a schematic diagram illustrating an example of a flow in a separating and concentrating step (B) and an abrasive collecting step (C) of the method of the present invention for regenerating an abrasive.

FIG. 2 is a schematic diagram illustrating an example of a flow in a separating and concentrating step B and an abrasive collecting step C of the present invention for regenerating an abrasive.

As a step (B-1), the abrasive-containing slurry (mother liquid) 13 which was collected in the previous slurry collecting step A is poured into a conditioning container 14 equipped with a stirrer 15. Thereafter, as a step (B-2), an alkaline earth metal salt is added as an inorganic salt with the addition container 16 to the abrasive-containing slurry (mother liquid) 13 while the abrasive-containing slurry (mother liquid) 13 is stirred. Subsequently, as a step (B-3), by adding the inorganic salt, the abrasive particles in the abrasive-containing slurry (mother liquid) 13 settle on the bottom to generate a concentrate 18. A non-abrasive component(s) such as glass is included in the supernatant 17 from which the abrasive is separated and settled. The abrasive and the non-abrasive component are thus separated from each other.

<Alkaline Earth Metal Salt>

In the present invention, the inorganic salt used for aggregating the abrasive is an alkaline earth metal salt.

Examples of the alkaline earth metal salt used in the present invention include calcium salts, strontium salts, and barium salts. In a broad sense, the elements of Group 2 of the periodic table is also defined as alkaline earth metals. Thus, beryllium salts and magnesium salts are also regarded as the alkaline earth metal salts in the present invention.

Preferably, the alkaline earth metal salt used in the present invention is a halide, a sulfate, a carbonate, an acetate or the like.

Preferable alkaline earth metal salt used in the present invention is a magnesium salt.

Any electrolyte magnesium salt may be used in the present invention without particular limitation. In terms of high solubility in water, magnesium chloride, magnesium bromide, magnesium iodide, magnesium sulfate and magnesium acetate are preferable. In terms of a small change in pH and easiness of treating the sediment of the abrasive and the waste liquid, magnesium chloride and magnesium sulfate are particularly preferable.

<Method for Adding Inorganic Salt>

A method for adding the inorganic salt to the abrasive-containing slurry (mother liquid) will now be described.

a) Concentration of Inorganic Salt

The inorganic salt may be directly added to the abrasive-containing slurry (mother liquid), or may be dissolved in a solvent such as water and then added to the abrasive-containing slurry (mother liquid). It is preferable that the inorganic salt is dissolved in a solvent and then added to the abrasive-containing slurry to obtain a homogeneous state in the slurry after the addition.

The concentration of the inorganic salt is preferably 0.5 to 50% by mass in an aqueous solution. To suppress a change in pH of the system and achieve more efficient separation of the abrasive from the glass component, the concentration is preferably 10 to 40% by mass.

b) Temperature in Adding Inorganic Salt

The temperature when the inorganic salt is added may be in the range from the freezing temperature of the collected abrasive-containing slurry to 90° C. To efficiently separate the abrasive from the glass component, the temperature is preferably 10 to 40° C., and more preferably 15 to 35° C.

c) Speed of Adding Inorganic Salt

Speed of adding the inorganic salt to the abrasive-containing slurry (mother liquid) is preferably adjusted so that a portion with the high concentration in the collected abrasive-containing slurry is not generated and the added inorganic salt is homogeneously present in the collected abrasive-containing slurry. The amount of the added magnesium salt per minute is preferably 20% by mass or less, more preferably 10% by mass or less, per the total amount of the inorganic salt to be added.

d) pH Value after Addition of Inorganic Salt

In the method of the present invention for regenerating an abrasive, it is preferable that the pH of the collected abrasive-containing slurry is not adjusted in advance when the inorganic salt is added in the separating and concentrating step (B). Generally, the collected abrasive-containing slurry exhibits alkalinity and its pH ranges from 8 to less than 10 because this slurry contains the glass component. In the present invention, it is preferable that the separating and concentrating is conducted at a converted pH of the mother liquid at 25° C. of less than 10.0.

In the present invention, the pH can be obtained from the measurement at 25° C. using the Lacombe tester bench pH meter (pH1500, manufactured by AS ONE CORPORATION).

In the present invention, it is preferable that the pH is maintained to be equal to or less than the pH after the addition of the inorganic salt, upon the addition of the inorganic salt to the separation of the concentrate. In the present invention, the pH after the addition of the inorganic salt is the pH right after the end of adding the inorganic salt.

It is preferable that the pH is maintained to be equal to or less than the pH after the addition of the inorganic salt. Specifically, the pH is maintained to be less than 10.0, until the end of separating the concentrate.

e) Stirring after Addition of Inorganic Salt

After the addition of the inorganic salt, the stirring is continued for preferably 10 minutes or more, and more preferably 30 minutes or more. Upon the addition of the inorganic salt, the aggregation of the abrasive particles starts. The continuous stirring makes the aggregation state homogeneous in the system and reduces the particle size distribution, which makes the subsequent separation easy.

(3: Abrasive Collecting Step C)

In the separating and concentrating step B, the concentrate 18 which contains the collected abrasive particles is separated from the supernatant 17 which contains the glass component, and then the concentrate 18 is collected, as illustrated in FIG. 2.

a) Method for Separating Concentrate of Abrasive

As the method for separating a concentrate of an abrasive aggregate obtained by addition of an inorganic salt from a supernatant, a common solid-liquid separation method can be used. For example, spontaneous sedimentation can be utilized to remove only the supernatant for separating the supernatant. A forcible method utilizing mechanical actions such as a method using a centrifugal separator can also be employable. As a concentration method for the present invention, a method utilizing spontaneous sedimentation is preferable to avoid contamination as much as possible by an impurity(ies) (e.g., glass crude particles derived from a polished glass) in the concentrate 18 settled on the bottom and to obtain a high-purity regenerated abrasive.

By the addition of the organic salt, the specific weight of the concentrate 18 is higher than that of the collected slurry because the supernatant is separated with the collected abrasive particles aggregated, and thus the abrasive is concentrated. The concentration of the collected abrasive in the concentrate 18 is higher than that of the collected slurry.

For example, the separation of the concentrate 18 of the abrasive aggregate from the supernatant 17 can be conducted as follows. As illustrated in FIG. 2, the concentrate 18 which contains the collected abrasive settled on the bottom is separated from the supernatant 17 which contains the non-abrasive component(s) utilizing spontaneous sedimentation as the step (B-3). Thereafter, the discharging pipe 19 is put in the container 14 to reach near the interface between the supernatant 17 and the concentrate 18, and then only the supernatant 17 is discharged to the outside of the container using the pump 20, as the step (C-1). Then, the concentrate 18 which contains the abrasive is collected.

(4: Particle Size Adjusting Step D)

In the method of the present invention for regenerating an abrasive, the abrasive aggregate in a form of secondary particles are peptized to obtain a particle size distribution of primary particles, as a final step to make the used abrasive collected through the above steps reusable.

The concentrate collected by using inorganic salt, etc. to aggregate abrasive particles is composed of lumps of secondary particles. Thus, for the purpose of the reuse, it is preferable to conduct the particle size adjusting step D to cause re-dispersion through breaking the aggregate into pure particles (i.e., primary particles) as a final step.

In the particle size adjusting step D, the aggregated abrasive component obtained in the abrasive collecting step C is re-dispersed to adjust the particle size distribution to be equivalent to that in the un-treated abrasive-containing slurry.

Examples of the method for re-dispersing the aggregated abrasive particles include the following: a) water is added to lower the concentration of the inorganic ion in the solution; b) a metal-separating agent (or a dispersing agent) is added to lower the concentration of the metal ion on the abrasive; and c) the aggregated abrasive particles are cracked using a dispersing device or the like.

One of these methods can be used alone, or two or more of them may be used in combination. Preferably, any two of the methods a), b) and c) are used in combination. More preferably, all of the methods a), b) and c) are used in combination.

In the case of adding water, the amount of water to be added is adjusted based on the volume of the concentrated slurry. Generally, the amount of water is 5 to 50% by volume of the concentrated slurry, and preferably 10 to 40% by volume of the concentrated slurry.

Preferable examples of the metal-separating agent (dispersing agent) include agents composed of a poly-carboxylic acid-based polymer including a carboxyl group. An acrylic acid-maleic acid copolymer is particularly preferable. Specifically, POLITY A-550 (manufactured by Lion Corporation) is given as an example. The amount of the metal-separating agent (dispersing agent) to be added to the concentrated slurry is preferably 0.01 to 5% by volume.

Examples of the dispersing device include ultrasonic dispersers and media mills such as sand mills and bead mills. Ultrasonic dispersers are particularly preferable.

For example, an ultrasonic disperser is available from SMT Corporation, Ginsen Corporation, TAITEC Corporation, BRANSON, Kinematica AG, and NISSEI Corporation. Examples include UDU-1 and UH-600MC manufactured by SMT Corporation, GSD600CVP manufactured by Ginsen Corporation and RUS600TCVP manufactured by NISSEI Corporation. The frequency of ultrasonic is not particularly limited.

Examples of circulating type devices that conduct mechanical stirring and ultrasonic dispersion simultaneously include, but are not limited to, UDU-1 and UH-600MC manufactured by SMT Corporation, GSD600RCVP and GSD1200RCVP manufactured by Ginsen Corporation and RUS600TCVP manufactured by NISSEI Corporation.

Figure 3:
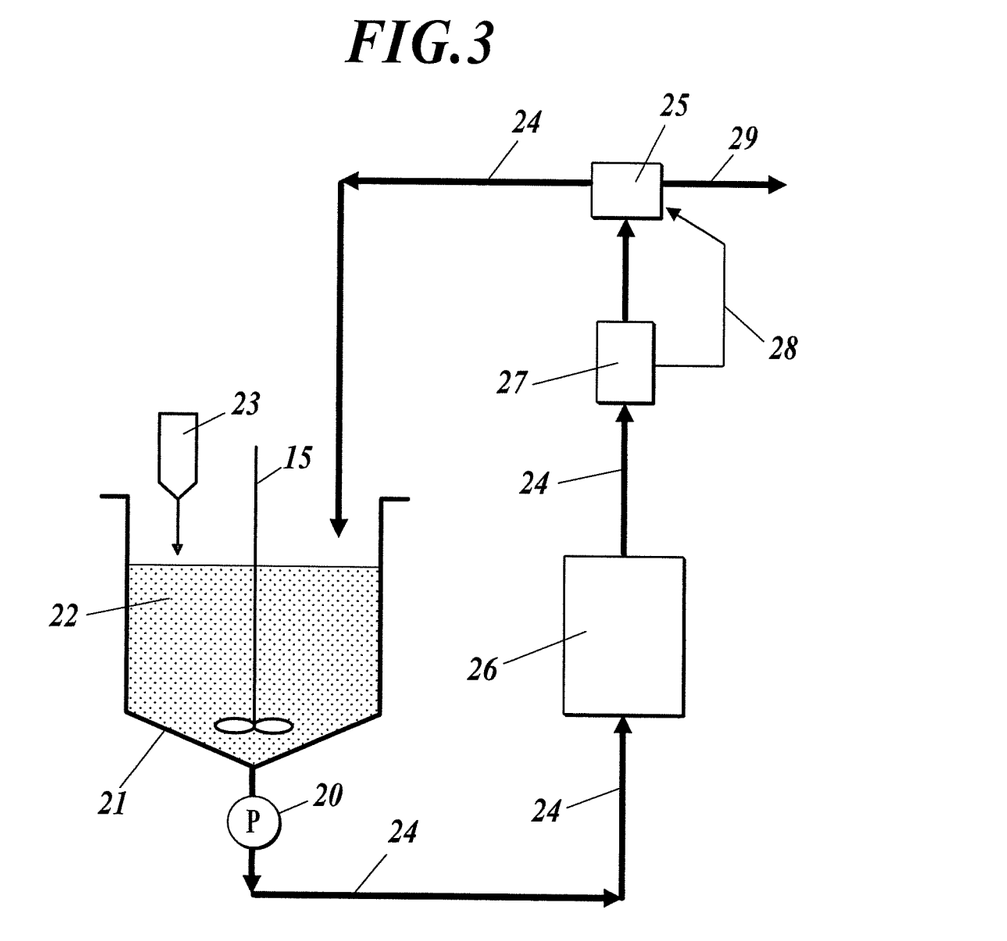
FIG. 3 This is a schematic diagram illustrating an example of a flow in the particle size adjusting step (D) using an ultrasonic disperser.

FIG. 3 is a schematic diagram illustrating an example of a flow in the particle size adjusting step D using an ultrasonic disperser.

As illustrated in FIG. 3, to the concentrate 18 obtained in the abrasive collecting step C in a conditioning container 21, water is added to lower the concentration of the inorganic salt to prepare an abrasive-dispersing liquid 22 and pools it in the conditioning container 21. Then, the metal-separating agent (dispersing agent composed of a polymer) is added from an addition container 23 to the abrasive-dispersing liquid 22 being stirred using a stirrer 15. Thereafter, the resulting liquid is passed through a flow path 24 using a pump 20 to an ultrasonic dispersing device 26, and is then subjected to dispersion to break the aggregated particles of the abrasive. Subsequently, the particle size distribution of the abrasive particles after dispersion is monitored using a particle size measuring device 27 provided in the downstream of the ultrasonic disperser 26. Upon confirming that the particle size distribution of the abrasive-dispersing liquid 22 has reached a desired value, a three-way valve 25 is controlled, and the resulting abrasive-dispersing liquid 22 is then passed through a flow path 29. The regenerated abrasive can be thus obtained.

Preferably, a change with time of the particle size distribution obtained in this step is small, and a change in the particle size after one day has passed is small.

[Regenerated Abrasive]

In the present invention, the particle size distribution of the collected abrasive obtained after the particle size adjusting step D as a final product is difficult to change with time. The concentration is higher than that after the collection. The content of inorganic salt preferably ranges from 0.0005 to 0.08% by mass, and the content(s) of the other component(s) are preferably 1.0% by mass or less.

EXAMPLES

The present invention will now be described in detail with reference to Examples, but the present invention is not limited thereto. The percent sign "%" in the following description means "% by mass" unless described otherwise.

<<Preparation of Regenerated Abrasive>>

[Preparation of Regenerated Abrasive 1]

A regenerated abrasive 1 was prepared through the following steps. Regeneration of an abrasive was conducted at 25° C. and 55% RH unless described otherwise. In the regeneration, the temperature of the solution etc. was also 25° C.

1) Slurry Collecting Step A

After a glass substrate for a hard disc was polished as a polishing process illustrated in FIG. 1 using zirconium oxide as an abrasive, 210 liters of the first abrasive-containing slurry which contained the washing water and 30 liters of the second abrasive-containing slurry which had been used were collected, and then mixed to obtain 240 liters of the collected slurry in total. The specific weight of this collected slurry was 1.03, and the collected slurry contained 8.5 kg of zirconium oxide.

2) Separating and Concentrating Step B

Subsequently, 2.0 liters of 10% aqueous solution by mass of magnesium chloride as the inorganic salt was added to the collected slurry using 10 minutes while the collected slurry was stirred so as to avoid sedimentation of zirconium oxide. The converted pH value right after the end of adding magnesium chloride at 25° C. was 8.60.

3) Abrasive Collecting Step C

The stirring was continued for 30 minutes maintaining the above condition, and then the resulting slurry was left to stand for 45 minutes to conduct sedimentation and separate the concentrate from the supernatant utilizing spontaneous sedimentation. After 45 minutes had passed, the supernatant was discharged using the discharging pump in accordance with the step (C-1) in FIG. 2, and the concentrate was separated and collected. The volume of the collected concentrate was 60 liters.

4) Particle Size Adjusting Step D (Dispersing Step)

To the separated concentrate, 12 liters of water was added. In addition, 300 g of POLITY A-550 (Manufactured by Lion Corporation) was added as the dispersing agent composed of a polymer (metal-separating agent) to the separated concentrate, followed by stirring for 30 minutes. Thereafter, in the step shown in FIG. 3, the concentrate was dispersed and broken down using an ultrasonic disperser (Manufactured by BRANSON).

After the dispersion was completed, then filtration was conducted using a membrane filter with a pore size of 10 μm to obtain the regenerated zirconium oxide-containing regenerated abrasive 1. The concentration of the zirconium oxide was 10.3% by mass, and the particle size D90 was less than 2.0 μm. The content of magnesium in the regenerated abrasive was 0.04% by mass.

[Preparation of Regenerated Abrasives 2 to 18]

Regenerated abrasives 2 to 18 were prepared by the same way as the regenerated abrasive 1 was prepared except that the type of abrasive was replaced with the abrasive as shown in table 1 in the same amount, inorganic salts as shown in table 1 were used in place of magnesium chloride in the same amount in the separating and concentrating step B and dispersing devices as shown in table 1 were used in place of the dispersing device used in the particle size adjusting step D. In addition, in the preparations of the regenerated abrasives 4 and 5, a converted pH of the slurry at 25° C. after the addition of the inorganic salt in the separating and concentrating step B was adjusted to 10.10 and 10.40, respectively by using potassium hydrate.

The used device and the materials are as follows:

Bead mill-type disperser: Ultra apex mill (manufactured by KOTOBUKI INDUSTRIES CO., LTD.)

Zirconium oxide: product manufactured by China HZ

Alumina-zirconia: product manufactured by Saint-Gobain K.K.

Boron nitride: product manufactured by SHOWA DENKO K.K.

Alumina: product manufactured by NIHON MICRO COATING CO., LTD.

<<Evaluation of Regenerated Abrasive>>

[Evaluation for Purity of Regenerated Abrasive]

The purity of each of the regenerated abrasives 1 to 18 was obtained by component analysis using an ICP Atomic Emission spectrometer according to the method described below.

For the evaluation, the content of Si of the glass component and the content of the abrasive-specific element were quantified, and then the contents of the Si of the glass component and the abrasive-specific element were obtained on the basis of the total of the content of Si and the content of the element of the abrasive.

(Component Analysis using ICP Atomic Emission Spectrometry)

The concentrations of the abrasive-specific component and the glass component (Si component) in each prepared regenerated abrasive were measured using ICP Atomic Emission Spectrometry. Specific steps are described below.

<Preparation of Sample Liquid A>

(a) 10 g of the regenerated abrasive was diluted with pure water in a volume of 90 ml, and 1 ml of the liquid was taken from the liquid being stirred using a stirrer (b) 5 ml of hydrofluoric acid for atomic absorption was added to the liquid (c) silica was eluted by ultrasonic dispersion (d) the liquid was left to stand at room temperature for 30 minutes (e) ultrapure water was added to the liquid to obtain a volume of 50 ml Each liquid prepared through the above steps are called the sample liquid A.

(b) 5 ml of high-purity sulfuric acid was added to and dissolved in the above taken liquid (c) ultrapure water was added to the liquid to obtain a volume of 50 ml (d) the liquid was diluted as needed with ultrapure water and subjected to measurement using ICP-AES (e) the abrasive-specific element was quantified through a calibration-curve method using matrix matching <ICP Atomic Emission Spectrometer>

An ICP-AES device manufactured by SII nanotechnology Inc. was used.

Results from the above measurements are shown in Table 1.

TABLE 1

| REGENERATED ABRASIVE NO. | TYPE OF ABRASIVE | SEPARATING AND CONCENTRATING STEP B | | PARTICLE SIZE ADJUSTING STEP D DISPERSING DEVICE |
|---|---|---|---|---|
| | | TYPE OF INORGANIC SALT | pH AFTER ADDTION OF INORGANIC SALT | |
| 1 | ZIRCONIUM OXIDE | MAGNESIUM CHLORIDE | 8.60 | ULTRASONIC DISPERSER |
| 2 | ZIRCONIUM OXIDE | MAGNESIUM SULFATE | 8.94 | ULTRASONIC DISPERSER |
| 3 | ZIRCONIUM OXIDE | MAGNESIUM SULFATE | 8.94 | BEAD MILL-TYPE DISPERSER |
| 4 | ZIRCONIUM OXIDE | MAGNESIUM CHLORIDE | 10.10 | ULTRASONIC DISPERSER |
| 5 | ZIRCONIUM OXIDE | MAGNESIUM CHLORIDE | 10.40 | ULTRASONIC DISPERSER |
| 6 | ZIRCONIUM OXIDE | CALCIUM CHLORIDE | 8.41 | ULTRASONIC DISPERSER |
| 7 | ZIRCONIUM OXIDE | POTASSIUM CARBONATE | 9.86 | ULTRASONIC DISPERSER |
| 8 | ALUMINA-ZIRCONIA | MAGNESIUM CHLORIDE | 8.60 | ULTRASONIC DISPERSER |
| 9 | ALUMINA-ZIRCONIA | MAGNESIUM SULFATE | 8.94 | ULTRASONIC DISPERSER |
| 10 | ALUMINA-ZIRCONIA | POTASSIUM CARBONATE | 9.86 | ULTRASONIC DISPERSER |
| 11 | BORON NITRIDE | MAGNESIUM CHLORIDE | 8.60 | ULTRASONIC DISPERSER |
| 12 | BORON NITRIDE | MAGNESIUM SULFATE | 8.94 | ULTRASONIC DISPERSER |
| 13 | BORON NITRIDE | MAGNESIUM SULFATE | 8.94 | BEAD MILL-TYPE DISPERSER |
| 14 | BORON NITRIDE | MAGNESIUM CHLORIDE | 8.41 | ULTRASONIC DISPERSER |
| 15 | BORON NITRIDE | POTASSIUM CARBONATE | 9.86 | ULTRASONIC DISPERSER |
| 16 | ALUMINA | MAGNESIUM CHLORIDE | 8.60 | ULTRASONIC DISPERSER |
| 17 | ALUMINA | MAGNESIUM SULFATE | 8.94 | BEAD MILL-TYPE DISPERSER |
| 18 | ALUMINA | POTASSIUM CARBONATE | 9.86 | ULTRASONIC DISPERSER |

| REGENERATED ABRASIVE NO. | RESULT FROM ICP ANALYSIS | | NOTE |
|---|---|---|---|
| | Si CONCENTRATION [mg/L] | ABRASIVE CONCENTRATION [g/L] | |
| 1 | 887 | 111 | PRESENT INVENTION |
| 2 | 918 | 100 | PRESENT INVENTION |
| 3 | 920 | 98 | PRESENT INVENTION |
| 4 | 995 | 94 | PRESENT INVENTION |
| 5 | 1020 | 89 | PRESENT INVENTION |
| 6 | 920 | 112 | PRESENT INVENTION |
| 7 | 1305 | 99 | COMPARATIVE EXAMPLE |
| 8 | 836 | 120 | PRESENT INVENTION |
| 9 | 828 | 110 | PRESENT INVENTION |
| 10 | 1290 | 98 | COMPARATIVE EXAMPLE |
| 11 | 882 | 155 | PRESENT INVENTION |
| 12 | 852 | 143 | PRESENT INVENTION |
| 13 | 842 | 132 | PRESENT INVENTION |
| 14 | 880 | 150 | PRESENT INVENTION |
| 15 | 1415 | 106 | COMPARATIVE EXAMPLE |
| 16 | 893 | 124 | PRESENT INVENTION |
| 17 | 893 | 119 | PRESENT INVENTION |
| 18 | 1366 | 93 | COMPARATIVE EXAMPLE |

<Quantification of Si>

(a) the sample liquid A was filtrated using a membrane filter (hydrophilic PTFE)

(b) the filtrate was subjected to measurement using an Inductivity Coupled Plasma Atomic Emission spectrometer (ICP-AES)

(c) Si was quantified through a standard addition method

<Quantification of Abrasive-Specific Element>

(a) 5 ml of the sample liquid A was taken from the sample liquid A in a well dispersing state As evident from the results shown in Table 1, the methods of the present invention for regenerating an abrasive is excellent compared to those of the comparative examples, because the present invention can provide a high-purity regenerated abrasive and can efficiently remove the glass component which is an impurity.

Example 2

Regenerated abrasives 101 to 107 (using synthetic diamond) were prepared by the same way as the regenerated abrasives 1 to 7 were prepared, respectively, except that synthetic diamond (manufactured by NIHON MICRO COATING CO., LTD.) was used in place of zirconium oxide used as the abrasive in the preparation of the regenerated abrasives 1 to 7 in Example 1. Regenerated abrasives 108 to 114 (using silicon carbide) were prepared by the same way as the regenerated abrasives 1 to 7 were prepared, respectively, except that silicon carbide (manufactured by NIHON MICRO COATING CO., LTD.) was used in place of zirconium oxide used as the abrasive in the preparation of the regenerated abrasives 1 to 7 in Example 1.

Subsequently, the above measurements were performed on each regenerated abrasive. It is revealed that the present invention can provide the same effect not only in the case where zirconium oxide is used as an abrasive but also in the case where synthetic diamond is used as an abrasive and in the case where silicon carbide is used as an abrasive.

INDUSTRIAL APPLICABILITY

The method of the present invention for regenerating an abrasive can efficiently collect the abrasive from the used-abrasive containing slurry and thereafter obtain a high-purity regenerated abrasive in a simple manner.

DESCRIPTION OF REFERENCE NUMERALS

1 Abrasive device
2 Abrasive surface plate
3 Object to be polished
4 Abrasive-containing liquid
5 Slurry nozzle
7 Washing water
8 Washing water spraying nozzle
10 Wash liquid containing abrasive
13 Abrasive-containing slurry (mother liquid)
14, 21 Conditioning container
15 Stirrer
16 Addition container
17 Supernatant
18 Concentrate
19 Discharging pipe
20 Pump
25 Three-way valve
26 Ultrasonic disperser
27 Particle size measuring device
A Slurry collecting step A
B Separating and concentrating step B
C Abrasive collecting step C
D Particle size adjusting step D
E Inorganic salt
F Regenerated abrasive
K Abrasive cloth
N Pressure
$T_1$ Slurry tank
$T_2$ Washing water tank
$T_3$ Wash liquid tank

The invention claimed is:

1. A method for regenerating an abrasive from a used abrasive-containing slurry, the method comprising:
   (A) collecting an abrasive-containing slurry discharged from an abrasive device;
   (B) separating the abrasive from a mother liquid and concentrating the abrasive by adding an alkaline earth metal salt as an inorganic salt to the collected abrasive-containing slurry and aggregating the abrasive;
   (C) collecting the separated and concentrated abrasive; and
   (D) adjusting sizes of particles of the collected abrasive, after the step (C),
   wherein the abrasive is at least one selected from a group consisting of diamond, boron nitride, silicon carbide, alumina, alumina-zirconia and zirconium oxide,
   wherein in the step (D), a dispersing agent is added to a solution of the collected abrasive, and thereafter dispersion of the abrasive is conducted using an ultrasonic disperser or a bead mill disperser to control the sizes of the particles of the regenerated abrasive, and
   wherein a first abrasive-containing slurry that contains washing water and a second abrasive-containing slurry that was used are collected in the step (A).

2. The method of claim 1, wherein the first abrasive-containing slurry and the second abrasive-containing slurry collected in the step (A) are mixed and thereafter subjected to the step (B) and the step (C).

3. The method of claim 1, wherein the first abrasive-containing slurry and the second abrasive-containing slurry collected in the step (A) are separately subjected to the step (B) and the step (C).

4. The method of claim 1, wherein the alkaline earth metal salt used in the step (B) is a magnesium salt.

5. The method of claim 1, wherein in the step (C), the abrasive is collected through separation by decantation utilizing sedimentation under an influence of only ambient gravitational force.

6. The method of claim 1, wherein the ultrasonic disperser is used in the step (D).

7. The method of claim 1, wherein the dispersing agent is composed of a poly-carboxylic acid-based polymer.

8. The method of claim 1, wherein the separating and concentrating are conducted at a pH of less than 10.0 of the mother liquid at 25° C. in the step (B).

* * * * *